United States Patent
Anthony (10) Patent No.: US 9,148,040 B2
(45) Date of Patent: Sep. 29, 2015

(54) ELECTROMAGNETIC COMPONENT FOR A STATOR SEGMENT OF AN ELECTRICAL MACHINE

(75) Inventor: John E. Anthony, Derby (GB)

(73) Assignee: ROLLS-ROYCE plc, London (GB)

( * ) Notice: Subject to any disclaimer, the term of this patent is extended or adjusted under 35 U.S.C. 154(b) by 588 days.

(21) Appl. No.: 13/530,600

(22) Filed: Jun. 22, 2012

(65) Prior Publication Data
US 2013/0020888 A1    Jan. 24, 2013

(30) Foreign Application Priority Data
Jul. 18, 2011    (GB) .................................. 1112319.7

(51) Int. Cl.
| | | |
|---|---|---|
| *H02K 9/00* | (2006.01) | |
| *H02K 37/00* | (2006.01) | |
| *H02K 21/12* | (2006.01) | |
| *H02K 1/06* | (2006.01) | |
| *H02K 9/197* | (2006.01) | |
| *F01D 15/10* | (2006.01) | |
| *F01D 25/12* | (2006.01) | |
| *H02K 1/14* | (2006.01) | |
| *H02K 1/18* | (2006.01) | |
| *H02K 5/22* | (2006.01) | |
| *H02K 3/18* | (2006.01) | |
| *H02K 3/24* | (2006.01) | |

(Continued)

(52) U.S. Cl.
CPC ................ *H02K 9/197* (2013.01); *F01D 15/10* (2013.01); *F01D 25/12* (2013.01); *H02K 1/141* (2013.01); *H02K 1/185* (2013.01); *H02K 5/225* (2013.01); *H02K 3/18* (2013.01); *H02K 3/24* (2013.01); *H02K 5/04* (2013.01); *H02K 7/1823* (2013.01); *H02K 2213/06* (2013.01); *H02K 2213/12* (2013.01); *Y02T 50/675* (2013.01)

(58) Field of Classification Search
CPC .................................... H02K 1/18; H02K 9/04
USPC ........ 310/52, 49.43, 156.57, 216.106, 54, 58, 310/402, 403, 418
See application file for complete search history.

(56) References Cited

U.S. PATENT DOCUMENTS 3,634,705 A * 1/1972 Fidei ............................... 310/57
3,900,274 A * 8/1975 Johnston et al. .............. 416/155

(Continued)

FOREIGN PATENT DOCUMENTS

| EP | 818870 A1 * | 1/1998 |
|---|---|---|
| EP | 2 378 631 A1 | 10/2011 |

(Continued)

OTHER PUBLICATIONS

Oct. 25, 2011 British Search Report issued in British Patent Application No. 1112319.7.

*Primary Examiner* — Dang Le
*Assistant Examiner* — Jose Gonzalez Quinones
(74) *Attorney, Agent, or Firm* — Oliff PLC (57) ABSTRACT

An electromagnetic component for mounting in a framework 47 so as to provide a stator segment 20 of an electrical machine 12. The component comprises a magnetic flux guide 32 and an electrical winding 34 for electromagnetic interaction with the magnetic flux guide 32. The component further comprises electrical terminals 52 for connecting the electrical winding 34 to an electrical network 61, at least one fluid pathway 42 for receiving a flow of cooling fluid in normal use, and at least one fluid connector 54 for coupling the fluid pathway 42 to a source of cooling fluid.

13 Claims, 5 Drawing Sheets

(51) Int. Cl.
*H02K 5/04* (2006.01)
*H02K 7/18* (2006.01)

(56) References Cited

U.S. PATENT DOCUMENTS

2007/0152534 A1* 7/2007 Herrmann ............... 310/268
2010/0244603 A1* 9/2010 El-Refaie et al. ......... 310/152

FOREIGN PATENT DOCUMENTS

| GB | 715277 A1 | * 9/1954 |
| GB | 881908 | 11/1961 |
| GB | 1175232 A1 | * 12/1969 |
| GB | 2 295 730 A | 6/1996 |
| WO | WO 2007/048567 A1 | 5/2007 |

* cited by examiner

ELECTROMAGNETIC COMPONENT FOR A STATOR SEGMENT OF AN ELECTRICAL MACHINE

FIELD OF THE INVENTION

The present invention relates to an electromagnetic component for a stator segment of an electrical machine. Particularly, but not exclusively, the invention relates to such a component to form an easily maintainable stator of a generator for use in a gas turbine engine.

BACKGROUND OF THE INVENTION

It is known to provide electromagnetic generators for generating power from a gas turbine engine. Such generators can be housed within an engine structure such as a bearing housing. Such an arrangement offers advantages in terms of efficient packaging of engine components, but also poses new challenges, particularly in terms of maintenance.

In particular, the size and weight of electrical the rotors and stators of electrical machines makes removal and installation for maintenance and replacement difficult to carry out by hand. These difficulties are compounded by the magnetic forces produces between the stator and rotor when they are translated relative to each other.

Electrical machines housed within an engine structure such as a bearing housing may also experience relatively high temperatures in use, and so require a coolant system to provide a coolant flow through at least the stator. Such coolant systems also add further weight and complexity to the engine, and generally require an additional housing or casing in order to separate the coolant flow from the oil contained within the bearing housing.

The present invention seeks to address these issues.

SUMMARY OF THE INVENTION

Accordingly, in a first aspect, the present invention provides an electromagnetic component for mounting in a framework so as to provide a stator segment of an electrical machine, the component comprising:
  a magnetic flux guide;
  an electrical winding for electromagnetic interaction with the magnetic flux guide;
  electrical terminals for connecting the electrical winding to an electrical network;
  at least one fluid pathway for receiving a flow of cooling fluid in normal use; and,
  at least one fluid connector for coupling the fluid pathway to a source of cooling fluid.

In such an arrangement, an electrical machine formed of separate, modular machine segments can be provided, in which a cooling and electrical connection is provided for each machine segment, thereby providing lighter components which can be more easily handled.

The component may be arranged such that one or both of the fluid connector and the electrical terminals are connected when the component is mounted in the framework, and the component may be arranged to be connected by a push fit connector. Such an arrangement provides a means of connecting both electrical and fluid connections in a single operation.

The component may include a casing which may at least partly define the fluid pathway, and may be substantially fluid tight. The casing may surround the magnetic flux guide and the winding such that the coolant which flows along the cooling pathway is in thermal contact with one or both of the winding and the magnetic flux guide.

The fluid pathway may extend from an inlet of the casing to an outlet of the casing. The fluid pathway may be at least partly defined by a duct arrangement, which may extend from the inlet to the outlet. The duct arrangement may extend around at least part of the winding, such that the fluid within the duct arrangement is in thermal contact with the winding. Alternatively, the fluid pathway may be partly defined by the winding, and may be partly defined by channelling arrangements. The channelling arrangements may comprise baffles, which may be provided on an interior surface of the casing.

The containment of each segment within a casing prevents damage to other machine segments within the electrical machine upon failure of one of the machine segments, and therefore provides an electrical machine having an inherently fault tolerant design.

The casing may be formed of a non-magnetic material, that is to say that the material has a relative magnetic permeability of less than 100, and preferably less than 10 Examples of suitable non-magnetic materials include polymers such as Polyether ether ketone (PEEK). Further examples of suitable non-magnetic materials include non-magnetic metals such as aluminium, non-magnetic stainless steel alloys or titanium. Voids within the casing may be substantially or completely filled with polymer or another non-magnetic material. The voids may be filled using vacuum pressure impregnation (VPI).

The filler material may serve to rigidly constrain the parts within the casing, such as the flux guide, winding, and coolant ducts or pipework. The filler material may serve to reduce vibration of the parts within the casing to improve reliability. The filler material may serve to prevent parts within the casing from contacting each other. The filler material may serve to exclude air or any gas from the interior of the casing or from specific regions within the casing.

The component may comprise a mounting arrangement for cooperating with the framework to mount one or both of the fluid connector and the electrical terminals to a respective electrical or fluid location point of the electrical machine. The mounting arrangement may also mount the component to the framework The provision of the mounting arrangement helps to physically locate and securely mount the component, and in particular one or both of the electrical terminals and fluid connectors, into a correct position within the framework of the electrical machine. Such an arrangement has been found to counteract magnetic forces produced between the stator and rotors segments as the stators are translated.

The mounting arrangement may include a rail or channel, which cooperates in use with a corresponding channel or rail of the framework. The mounting may comprise a pair of rails and a pair of channels. The rails may be provided on the framework, and each rail may comprise a finger member which protrudes from an arm of the framework. The rails of each pair may extend from opposite sides of the arm. Each channel may comprise a recess provided on the component. The channels of each pair may extend from opposite sides of the casing. The mounting arrangement may be arranged such that the component is mounted by translation in one of an axial or a radial direction for installation or removal in a gas turbine engine.

The magnetic flux guide may be U-shaped, having a main body and a pair of arms extending therefrom, with the at least one winding being wrapped around one of the main body or one or both of the arms.

In a first embodiment, a single winding is wrapped around the main body of the magnetic flux guide. In a second embodiment, a single winding is wrapped around one of the arms. In a third embodiment, two windings are provided, with each winding being wrapped around a respective arm. Each component may comprise a single electrical phase within the electrical machine. Such an arrangement provides a fault tolerant electrical machine, and also provides an electrical machine in which there is substantially no magnetic flux between adjacent segments.

In a second aspect, the present invention provides an electrical machine comprising a plurality of stator segments in accordance with the first aspect of the invention.

In a third aspect, the present invention provides a gas turbine engine including an electrical machine in accordance with the second aspect of the invention.

The number of rotor poles and stator segments may be chosen such that the machine operates so as to minimise magnetic flux flow between adjacent stator segments in the stator. The electrical machine may comprise a fractional slot electrical machine, and may comprise a single layer concentrated winding electrical machine. The machine may comprise a 3, 4 or 5-phase machine. The machine may comprise more phases.

The term "fractional slot winding" as used in this specification refers to an electrical machine in which the number of slots divided by the number of phases and then by the number of poles results in a fractional (i.e. non-integer) value.

The term "concentrated winding" as used in this specification refers to an electrical machine in which each coil is wrapped around only 1 stator tooth (as opposed to being wrapped around 2 teeth that are generally not adjacent). The term "single layer" refers to an electrical machine in which each slot only contains one coilside, in contrast to "double layer", in which each slot contains 2 coilsides. The term "single layer concentrated winding" is also known in the art as "concentrated winding, alternate teeth wound."

The electrical machine may be located within the front bearing housing of the gas turbine engine, and one of the stator and the rotor may be driven by a spool of the gas turbine engine.

Embodiments of the invention will now be described with reference to the accompanying drawings, in which.

Figure 1:
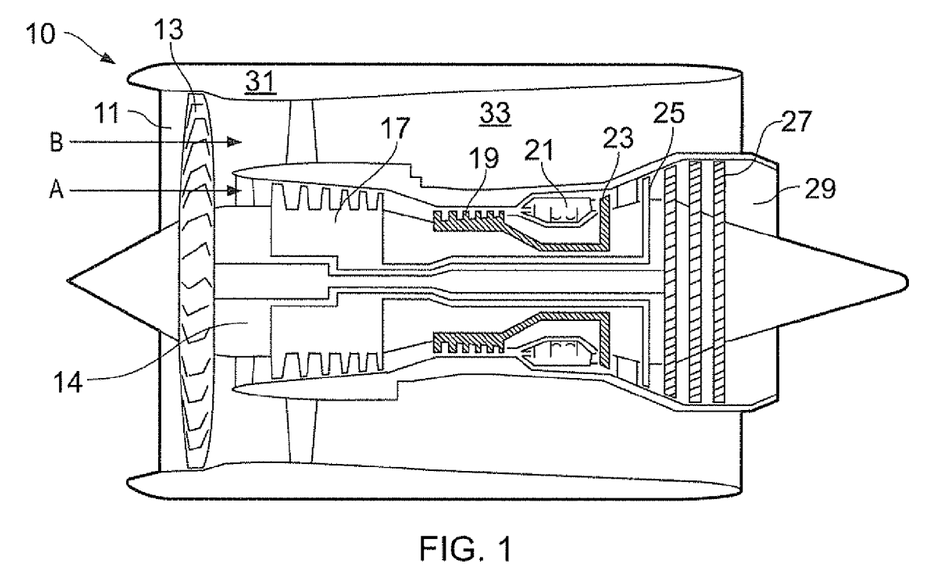
FIG. 1 shows a cross sectional view through a gas turbine engine

A gas turbine engine 10 is shown in FIG. 1 and comprises an air intake 11 and a propulsive fan 13 that generates two airflows A and B. The gas turbine engine 10 comprises, in axial flow A, an intermediate pressure compressor 17, a high pressure compressor 19, a combustor 21, a high pressure turbine 23, an intermediate pressure turbine 25, a low pressure turbine 27 and an exhaust nozzle 29. A nacelle 31 surrounds the gas turbine engine 10 and defines, in axial flow B, a bypass duct 33.

Figure 2:
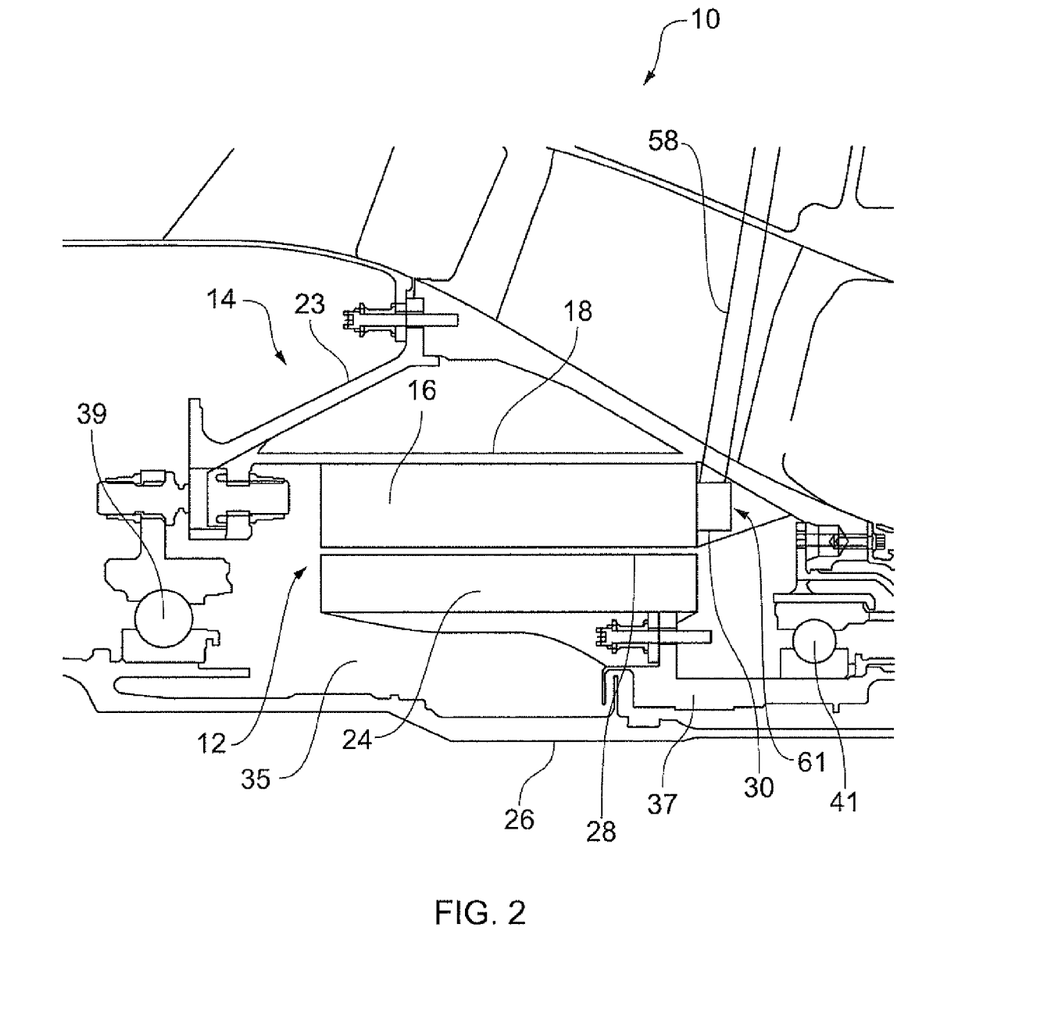
FIG. 2 shows a cross sectional view through a bearing housing of the gas turbine engine of FIG. 1 incorporating an electrical machine.

The gas turbine engine 10 includes a front bearing housing 14. Referring to FIG. 2, the front bearing housing 14 defines a chamber 35 bounded by a low pressure shaft 26 and bearing 39, an intermediate pressure shaft 37 and bearing 41, and outer chamber wall 23. The bearing housing 14 contains a quantity of oil for providing lubrication and cooling for the bearings 39, 41.

An electrical machine 12 is located within the chamber 35. The electrical machine 12 includes a rotor 24 comprising a series of alternately polarised rotor segments arranged in a ring, and attached radially outwardly of an intermediate pressure compressor shaft 37. The rotor segments could comprise either permanent magnets, or electromagnets. The electrical machine 12 also includes a stator 16 comprising a plurality of electromagnetic components in the form of stator segments 20 located radially outwardly of the rotor 24, and attached to a compressor casing 18 of the engine 10 via a mounting framework 47 An air gap 28 is provided between the rotor 24 and stator 16. In operation, when the engine is running, the shaft drives the rotor 24, such that the rotor 24 rotates relative to the stator 16 to generate electrical power.

The electrical machine is designed to minimise magnetic flux between adjacent stator segments. Such a design can be achieved by using a fractional slot, single layer concentrated winding electrical machine in which the slot and pole numbers are chosen so as to minimise the magnetic flux flow between adjacent segments. One suitable topology is for the machine to have slot and pole numbers related by $2p=N_s\pm 2$, where 2p is the number of poles of the rotor, and $N_s$ is the slot number of the stator. By minimising the electrical flux between adjacent stators, the magnetic forces encountered by a user when the stator is installed or removed are reduced, thereby permitting installation and removal by hand.

Each segment 20 comprises a magnetic flux guide 32, a pair of electrical windings 34 for electromagnetic interaction with the magnetic flux guide 32, electrical terminals 52 for connecting the electrical windings 34 to an electrical network 61, at least one fluid pathway 42 for receiving a flow of cooling fluid in normal use, and at least one fluid connector 54 for coupling the fluid pathway to a source of cooling fluid.

Figure 3:
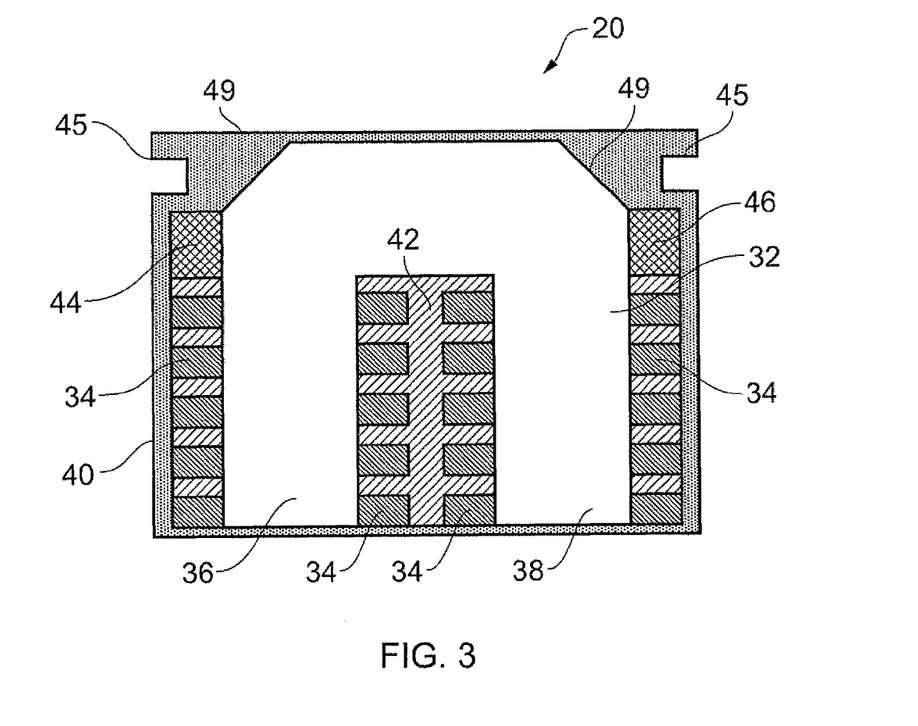
FIG. 3 shows a cross sectional view through an electrical component of the electrical machine of FIG. 2.

A cross section through an individual stator segment 20 is shown in FIG. 3. The segment 20 includes a generally U-shaped magnetic flux guide 32 formed of a ferromagnetic material such as iron or a suitable ferrimagnetic material, and a pair of electrical windings 34. The flux guide comprises a main body 33 and a pair of arms 36, 38 extending therefrom. The main body includes a tapered shoulder section 49 at ends of the main body.

Each winding 34 comprises a wire formed of an electrically conductive material such as copper or aluminium, and is turned around a respective arm 36, 38 of the magnetic flux guide 32. Electromagnetic interaction of the changing magnetic field between the flux guide 32 and the windings 34 as the rotor 24 rotates relative to the stator 16 generates an electrical current in the windings 34.

The magnetic flux guide 32 and windings 34 are enclosed within a casing 40 which is substantially fluid tight. The casing 40 is formed of a non-magnetic material, such as a polymer (e.g. PEEK), or a non-magnetic metal (e.g. aluminium or titanium) such that the casing does not substantially interact with the magnetic flux. More generally, materials having a relative magnetic permeability less than 100 are suitable for forming the casing 40.

Figure 5:
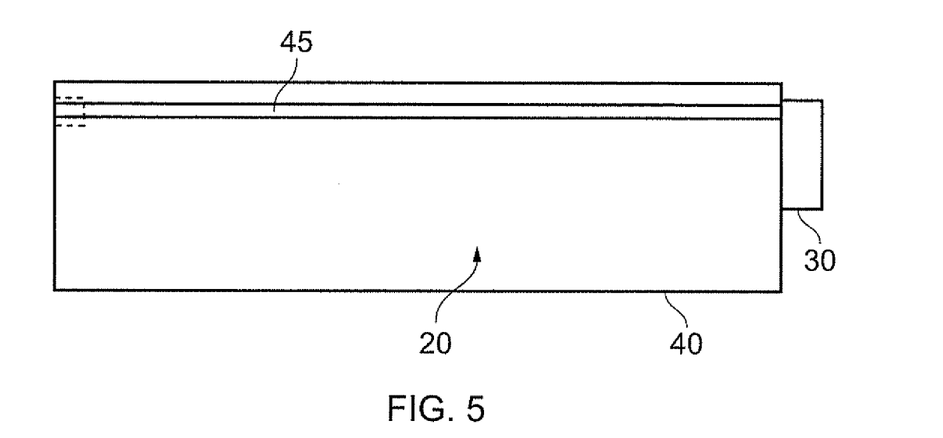
FIG. 5 shows a side view of the electromagnetic component of FIG. 3.

The casing 40 defines a fluid pathway through the segment 20, as shown by the shaded area 42. In use, a coolant such as oil or a water/glycol mix flows through the fluid pathway 42 within the casing 40 around the windings 34 and the flux guide 32 to remove heat generated by the stator segment 20 during operation. In use, the coolant flows from an inlet 44 to an outlet 46 located either side of arms 36, 38 and the main body 33 of the magnetic flux guide 32. The casing 40 also includes a plug 30 (shown in FIGS. 2 and 5). The plug 30 provides the electrical terminals 52 and cooling fluid connector 54 for the stator segment 20, and is described in further detail below.

The casing 40 further includes a mounting arrangement including a pair of channels in the form of recesses 45 located on opposite sides of the casing 40. Each recess 45 extends along substantially the whole the length of the casing 40. The recesses 45 are shown in further detail in FIG. 5.

Figure 4:
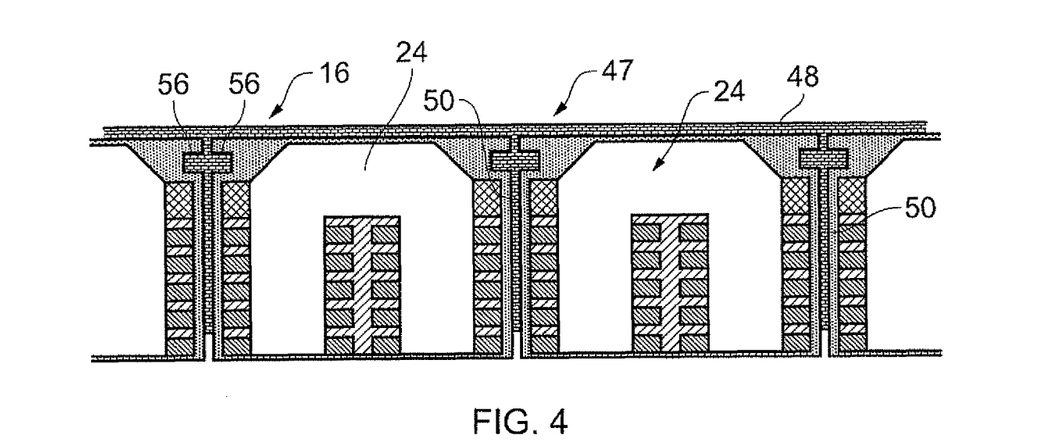
FIG. 4 shows a cross sectional view of part of a stator comprising a plurality of the electrical components of FIG. 3.

FIG. 4 shows part of a stator 16, including a plurality of installed stator segments 20. The stator 16 would ordinarily be curved to form a ring, but is shown as forming a straight line in FIG. 4 for simplicity. The stator 16 includes a framework 47 for mounting the stator segments 20. The stator 16 is formed of a non-magnetic material such as titanium, aluminium alloy or a non-magnetic stainless steel alloy. The framework 47 includes a chassis 48, and a plurality of spaced arms 50 extending from the chassis 48, inwardly toward the centre of the ring (i.e. downwardly as shown in FIG. 4). Each arm includes a pair of outwardly facing rails in the form of projections 56, which correspond with the recesses 45 of each stator segment 20 to form part of the mounting arrangement for mounting the segments 20 to the framework 47.

Figure 6:
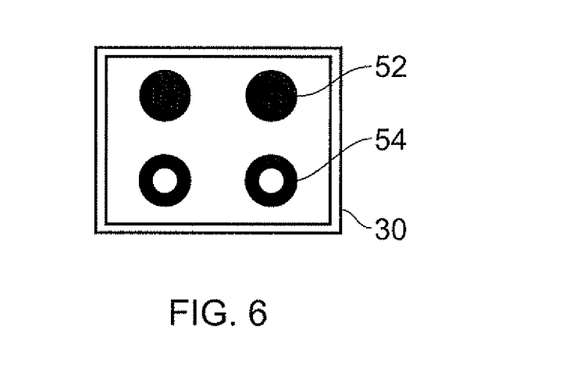
FIG. 6 shows an end view of part of the electromagnetic component of FIG. 3.

The plug 30 of a stator segment 20 is shown in further detail in FIG. 6. The plug 30 includes a pair of electrical terminals 52 and fluid connectors 54. The electrical terminals 52 are in electrical communication with the windings 34 to transmit electrical power from the stator segment 20 to the electrical network 61 via a conduit 58. The electrical network 61 could include connections (either direct or indirect) to other stator segments of the electrical machine 12 such that some or all of the segments 20 are in electrical communication with each other.

The fluid connectors 54 are each in fluid communication with a respective inlet 44 and outlet 46, and hence the fluid pathway 42. The plug 30 includes a shroud 51, which, when connected to a corresponding socket of the electrical machine 12, seals the electrical terminals 52, 54 and fluid pathway 42 from the environment of the bearing housing 14. The shroud 51 therefore prevents contact between the oil in the bearing housing 14 and the electrical terminals 52, thereby reducing the risk of a fire or explosion, and also prevents coolant leaking from the cooling pathway into the bearing housing 14.

The stator segments 20 are assembled to form the stator 16 by axial translation of each stator segment 20 into the framework 47 located within the bearing housing 14 of the gas turbine engine 10. Each segment 20 is mounted in place by the recesses 45 and projections 56 as it is located into the framework 47. As the segment 20 is pushed toward the framework 47, the plug 30 is mounted with the socket, which provides corresponding electrical terminals and fluid connectors to provide the connection between each segment 20 and the framework 47.

Once connected, cooling fluid is supplied in use to each segment 20 via the plug 30 by the conduit 58 from a cooling fluid reservoir (not shown). The cooling fluid flows through the fluid pathway 42 from the inlet 44 to the outlet 46, thereby cooling the stator segment 20. Cooling fluid is then returned to the reservoir through the plug 30 and conduit 58. Electrical power is also supplied from the segment 20 in use through the plug 30 to the conduit 58, and thereby to the electrical network 61. The electrical network 61 may provide electrical power for the engine 10, and may provide electrical power for the aircraft on which the engine 10 is installed.

The above described stator topology, in which a U-shaped magnetic flux guide 32 is provided around which one or a pair of electrical windings 34 is wound, provides a stator in which very little magnetic flux passes through adjacent stator segments 20. As a result, magnetic forces between adjacent stator segments 20 are reduced, and so do not act as strongly to inhibit removal or installation of stator segments 20.

Figure 7:
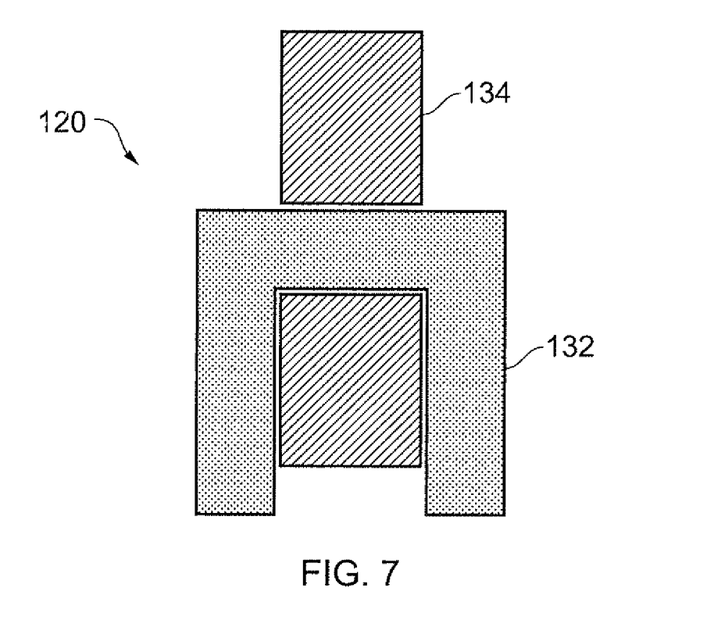
FIG. 7 shows a cross sectional view of part of a first alternative electrical component.

FIG. 7 shows a winding 134 and magnetic flux guide 132 of a first alternative stator segment 120 also having a U-shaped magnetic flux guide, and which therefore has the advantages outlined above with regard to the relatively low magnetic flux which passes between adjacent stator segments. However, in this embodiment, a single winding 134 is wrapped around the main body 133 of the magnetic flux guide 132. As before, the winding and magnetic flux guide would be surrounded in use by a casing (not shown), enclosing a fluid pathway, similar to the casing 40.

Figure 8:
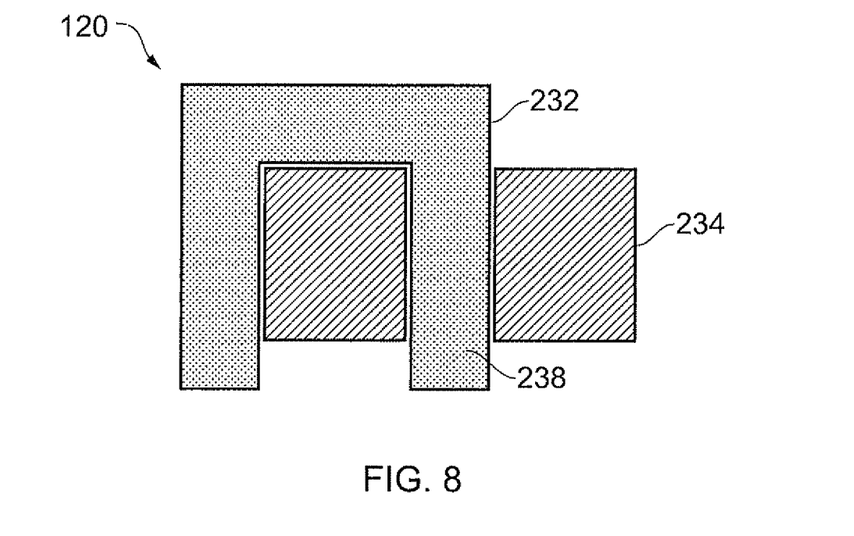
FIG. 8 shows a cross sectional view of part of a second alternative electrical component.

FIG. 8 shows a winding 234 and magnetic flux guide 232 of a second alternative stator segment also having a similar topology. In this embodiment, a single winding 234 is wrapped around an arm 238 of the magnetic flux guide 232. Such an arrangement may have a lower manufacturing cost in comparison to the previous embodiments, as fewer windings are required to form the stator.

A suitable topology would be selected according to the packaging requirements of the stator, as well as manufacturing and cooling aspects of the design. In particular, each of these topologies provides a space within the casing to provide an inlet and an outlet for the cooling pathway, and a particular winding arrangement may be selected to provide a convenient location for the inlet and the outlet.

The invention therefore provides a machine stator segment, electrical machine, and gas turbine incorporating the electrical machine, having a number of advantages.

The segments are each provided with a discrete casing, and each segment has an electrical terminal and a cooling connector. This enables segments to be installed and removed more easily, as a single action mounts each segment, and connects the electrical terminals and fluid connectors. The casing provided around each segment also enables the segment to be installed or removed without requiring a further step of first removing a housing, whilst isolating the flux guide, winding and cooling fluid from the bearing oil. The winding topology reduces the magnetic forces between components, thereby also easing installation and removal. The mounting arrangement further eases installation and removal by supporting the segment against the magnetic forces during translation of the segments.

The provision of a mechanical and magnetic separation between the stator segments provided by the casing and the mounting framework provides inherent fault tolerance, as defects in one segment are less likely to cause damage to other segments. Such inherent fault tolerance may allow relatively low turn windings to be used, since damage from thermal overload due to a faulted winding would be physically contained by the segment casing.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the claimed invention.

For example, though a three spool gas turbine engine is described in the present specification, having high, intermediate and low pressure spools, the present invention is equally applicable to two spool gas turbines having only high and low pressure spools. In a two spool gas turbine engine, the electrical machine could be installed in a front bearing housing located between the high and low pressure spools. Alternatively, in either a three spool or a two spool gas turbine engine, the electrical machine could be installed in the tailcone region, being driven by the low pressure shaft.

The fluid pathway could be arranged such that the cooling flows between adjacent segments of the stator, rather than flowing directly back to the fluid reservoir. Alternatively, the coolant could comprise air supplied for example from a compressor, and such an arrangement may be particularly suitable where the electrical machine is installed in the tailcone region. The stator segments could be installed by radial translation relative to the axis of the engine, in which case a different mounting arrangement and framework would be provided. A different electrical machine topology could be employed. For example, the rotor could be located radially outwardly of the stator. Two rotors or stators could be employed to provide a "double air gap" machine.

The invention claimed is:

1. An electromagnetic stator segment for mounting in a framework so as to provide a separately removable stator segment of an electrical machine comprising a plurality of modular stator segments, the stator segment comprising:
   a magnetic flux guide;
   an electrical winding for electromagnetic interaction with the magnetic flux guide;
   electrical terminals for connecting the electrical winding to an electrical network;
   at least one fluid pathway for receiving a flow of cooling fluid in normal use;
   at least one fluid connector for coupling the fluid pathway to a source of cooling fluid; and
   a mounting arrangement for cooperating with the framework to mount one or both of the fluid connector and the electrical terminals to a respective electrical or fluid location point of the electrical machine;
   wherein the mounting arrangement comprises a rail or channel, which cooperates in use with a corresponding channel or rail of the framework.

2. An electromagnetic component according to claim 1, wherein the component is arranged such that one or both of the fluid connector and the electrical terminals are connected when the component is mounted in the framework.

3. An electromagnetic component according to claim 2, wherein the component is arranged to be connected by a push fit connector.

4. An electromagnetic component according to claim 1, further comprising a casing.

5. An electromagnetic component according to claim 4, wherein the casing is formed of a non-magnetic material.

6. An electromagnetic component according to claim 1, wherein the mounting arrangement is arranged such that the component is mounted by translation in an axial direction relative to a principal axis of a gas turbine engine for installation or removal in the gas turbine engine.

7. An electromagnetic component according to claim 1, wherein the mounting arrangement is arranged such that the component is mounted by translation in a radial direction for installation or removal in a gas turbine engine.

8. An electrical machine comprising a plurality of stator segments as claimed claim 1.

9. An electrical machine according to claim 8, wherein a number of rotor poles and stator segments is chosen so as to minimise the magnetic flux flow between adjacent segments.

10. An electrical machine according to claim 9, comprising a fractional slot, single layer concentrated winding electrical machine.

11. A gas turbine engine comprising an electrical machine according to claim 8.

12. A gas turbine engine according to claim 11, wherein the electrical machine is located within the front bearing housing of the gas turbine engine.

13. A gas turbine engine low pressure spool according to claim 11, wherein one of the stator and the rotor is driven by a spool of the gas turbine engine.

* * * * *